Oct. 27, 1953 R. E. HERSEY 2,657,274

TELEPHONE SYSTEM

Filed July 28, 1951 7 Sheets-Sheet 1

INVENTOR
R. E. HERSEY
BY C. Mattice
ATTORNEY

INVENTOR
R.E. HERSEY
BY C. Mathie
ATTORNEY

Oct. 27, 1953 R. E. HERSEY 2,657,274

TELEPHONE SYSTEM

Filed July 28, 1951 7 Sheets-Sheet 3

INVENTOR
R. E. HERSEY
BY C. Mathie
ATTORNEY

Oct. 27, 1953 R. E. HERSEY 2,657,274

TELEPHONE SYSTEM

Filed July 28, 1951 7 Sheets-Sheet 4

INVENTOR
R. E. HERSEY
BY C. Mattice
ATTORNEY

Oct. 27, 1953 R. E. HERSEY 2,657,274

TELEPHONE SYSTEM

Filed July 28, 1951 7 Sheets-Sheet 5

INVENTOR
R. E. HERSEY
BY C. Mattice
ATTORNEY

Oct. 27, 1953 R. E. HERSEY 2,657,274

TELEPHONE SYSTEM

Filed July 28, 1951 7 Sheets-Sheet 6

INVENTOR
R. E. HERSEY
BY C. Mattice
ATTORNEY

Oct. 27, 1953 R. E. HERSEY 2,657,274

TELEPHONE SYSTEM

Filed July 28, 1951 7 Sheets-Sheet 7

INVENTOR
R. E. HERSEY
BY C. Mathie
ATTORNEY

Patented Oct. 27, 1953 2,657,274

UNITED STATES PATENT OFFICE 2,657,274

TELEPHONE SYSTEM

Ralph E. Hersey, Madison, N. J., assignor to Bell Telephone Laboratories, Incorporated, New York, N. Y., a corporation of New York Application July 28, 1951, Serial No. 239,090

5 Claims. (Cl. 179—27)

This invention relates to telephone systems and more particularly to dial telephone systems equipped for automatically recording the details of a call for charging purposes.

In such systems heretofore, when the calling subscriber required the assistance of an operator, there has been no provision for automatically billing the call since calls to operators are free. Therefore, if the operator completes the call, she has been required to write out a ticket, even though the call is for a local subscriber. These tickets require special handling by the accounting department and are therefore undesirable.

In accordance with the present invention, means is provided by which an operator, assisting in the completion of a call, may automatically record the details of the call on the same recording apparatus used by the subscriber.

A feature of the invention comprises means under the control of the operator to reassociate the district junctor or trunk included in the connection with a register sender and to record the details of the call in that register sender.

A further feature of the invention comprises means for indicating to the sender that the registration is for recording purposes only.

These and other features of the invention will become apparent from a consideration of the following description read in connection with the drawing, in which.

The present invention has been disclosed as it may be applied to a telephone system of the type disclosed in Patent No. 2,599,357 to C. E. Brooks-W. W. Carpenter, granted June 3, 1952, and reference is made to that patent for a complete disclosure of the operation of the system in setting up and recording a subscriber dialed call and for the details of certain parts of the system shown schematically herein.

As set forth in the above-identified Brooks-Carpenter patent, when a subscriber initiates a call, equipment, individual to the line link frame on which the line is located, operates primary and secondary line switches to connect the line with an idle district junctor and as a part of that operation selects a sender link which has access to the idle district junctor and an idle register sender. The line link frame equipment also identifies the calling line by its location on the frame and after selecting the idle district junctor, causes the calling line identity and the number of the junctor to be recorded on a tape recorder.

The calling subscriber then dials the number of the wanted line, which is registered in the sender. When the sender has received the office code, it seizes a marker and transmits the office code to marker, which connects the district junctor to a trunk outgoing to the wanted office. The sender then transmits the numerical designation to the wanted office where it is used to complete the connection. Before releasing, the sender seizes a called number recorder to which it transmits the called number and which causes that number and the district number to be recorded on the same tape recorder. The district junctor causes other records to be made of the time when conversation starts and ends.

In the case of a call for operator assistance, a special code is dialed without a numerical designation, the marker connects the district junctor to a trunk leading to an operator's position and transmits a signal to the sender which permits the sender to release without performing the two transmitting operations above mentioned.

*Call to a subscriber*

Figure 1:
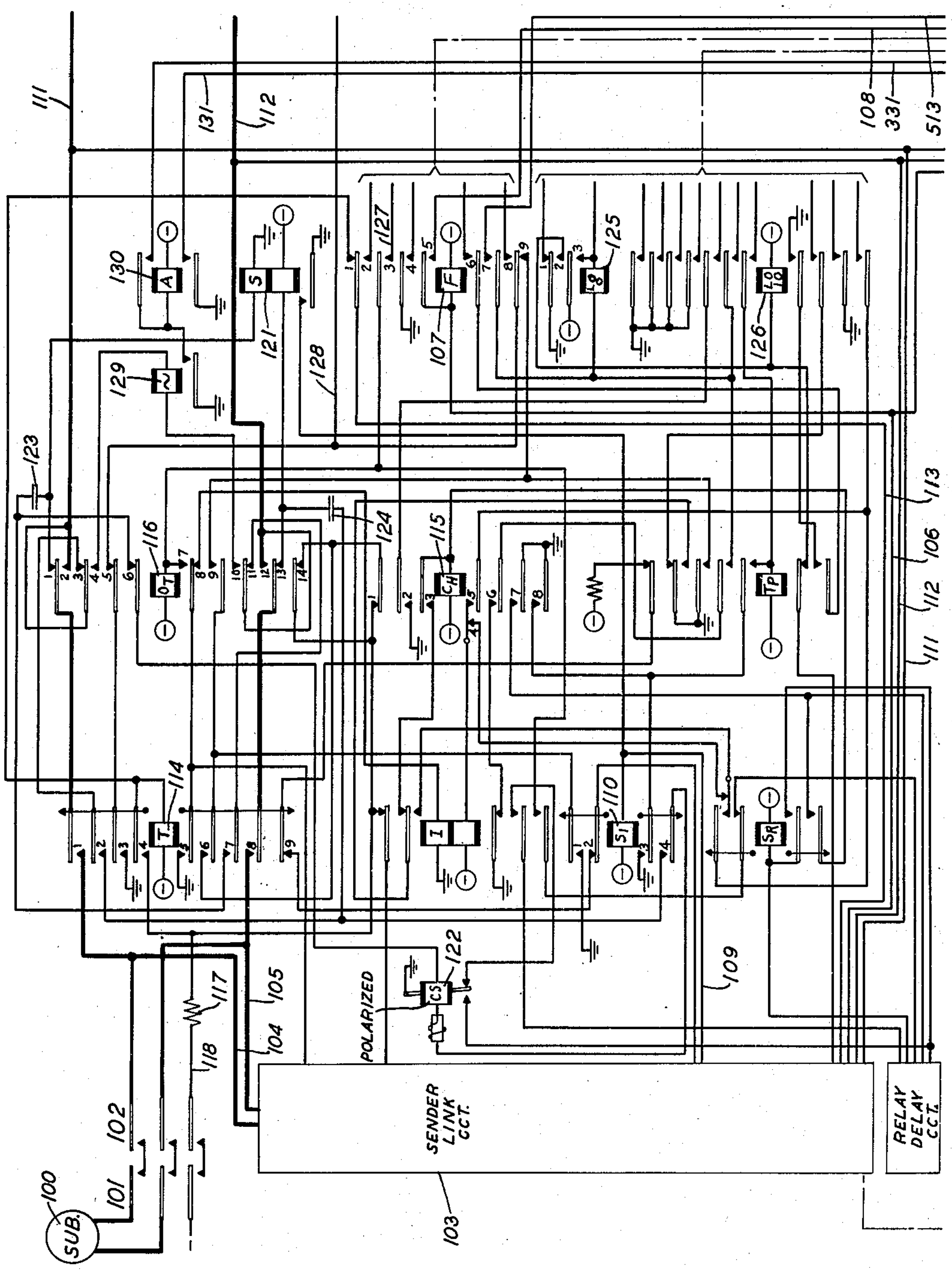
Fig. 1 shows a calling line, a district junctor and a sender link circuit.

Referring now to the drawings, it will be assumed that the subscriber at substation 100 initiates a call for another subscriber. The initiation of the call causes the operation of primary line switch 101 and secondary line switch 102 to connect the substation with the district junctor shown in Fig. 1 and through the sender link circuit 103 with the sender shown in Figs. 3, 4, 6 and 7. When the sender link 103 has operated, ground is connected to conductor 109, operating the S1 relay 110.

Figure 6:
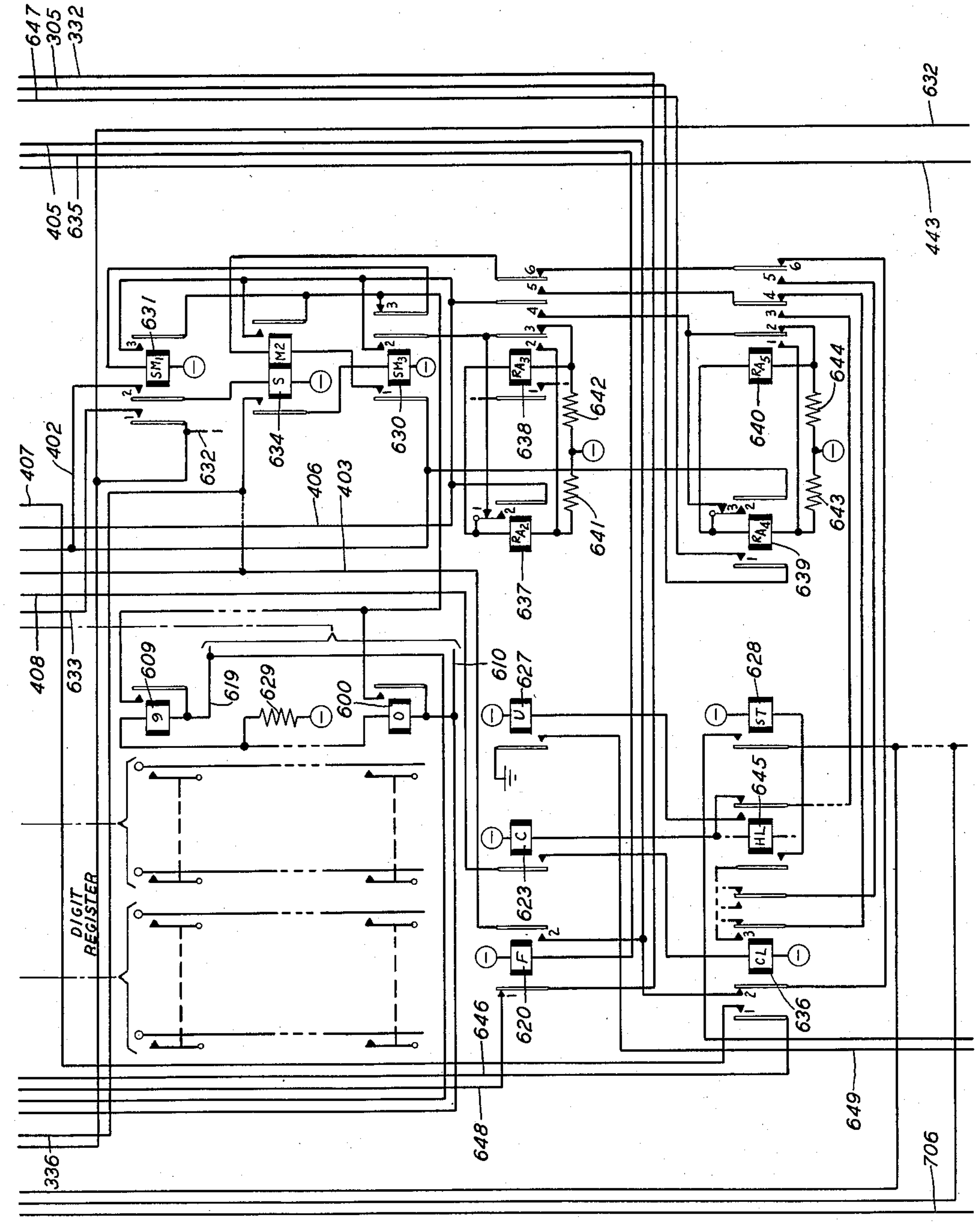
Figure 7:
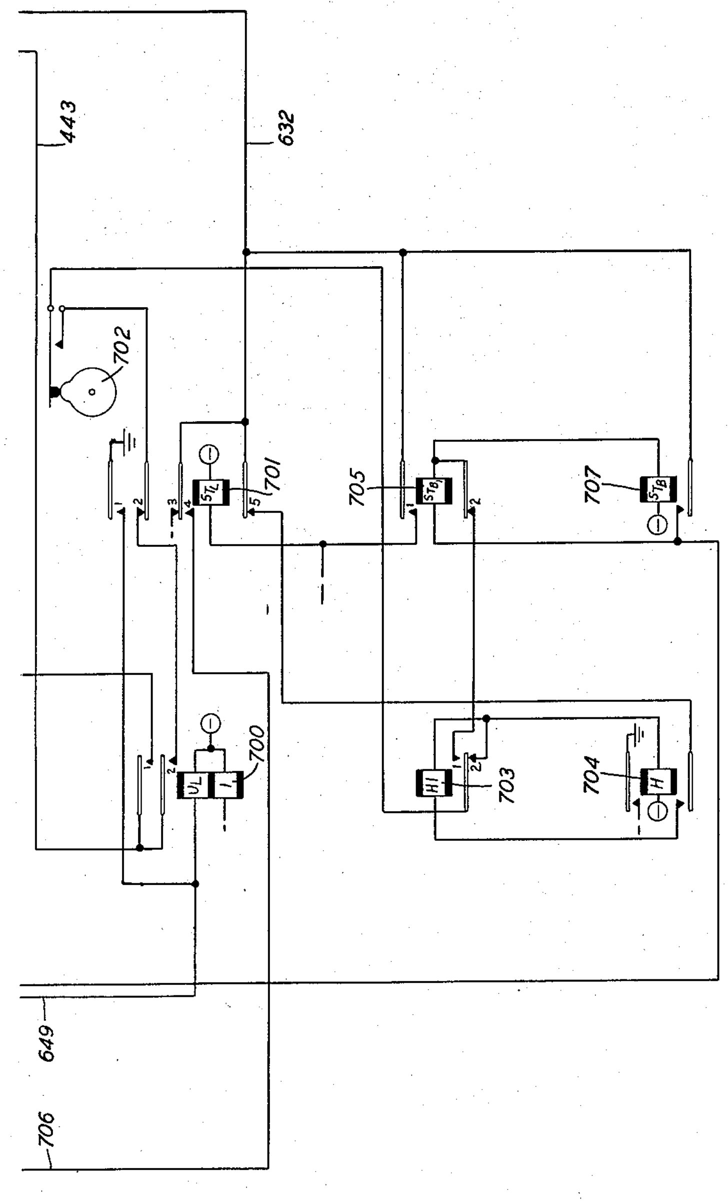
Figure 8:
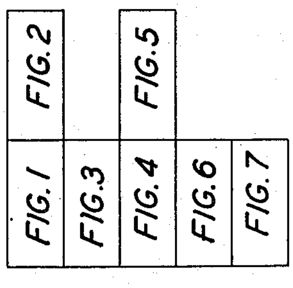
Fig. 8 shows the manner in which Figs. 1 to 7 should be arranged.

During the operation of the sender link 103, relays 302 and 303 are operated and the designation of the frame, on which the selected district junctor is located, is registered on the first vertical of the cross-bar switch forming the digit register of Fig. 6 by connecting ground to the operating circuit for the corresponding one of the select magnets 600 to 609 as described in the above-identified Brooks-Carpenter patent. Assuming that ground is connected to conductor 610, a circuit is completed for select magnet 600 through resistance 629 to battery. Select magnet 600 operates to prepare the corresponding cross-points and extends its operating ground over its contact, contact 3 of relay 630 to battery through the winding of relay 631. Relay 631 operates and closes a circuit from ground supplied to conductor 632 from line class relays (not shown) over its contact 1, conductor 633 to battery through the winding of off-normal relay 400.

Relay 400 when operated connects ground over its contact 2 and conductor 438 to battery through the winding of the sender busy relay 401. At its contact 6, relay 400 connects ground to conductor 402, completing a circuit over contact 2 of relay 631 to battery through the left winding of relay 634. Relay 634 operates and closes a circuit from ground at contact 5 of relay 400, conductor 403 through other contacts of the line class relays (not shown) to battery through the winding of relay 630.

Relay 630 closes a circuit from battery through the winding of the hold magnet 620 of the frame vertical of the digit register switch, conductor 635, contact 5 of relay 404, conductor 405, contact 2 of relay 636, contact 6 of relay 640, contact 6 of relay 638, right winding of relay 634, contact 1 of relay 630, to ground on conductor 402, operating magnet 620.

Relay 630 also opens the operating circuit of relay 631, causing that relay to release and open the operating circuit of relay 634, but relay 634 is held operated temporarily in the operating circuit for magnet 620. When magnet 620 has operated completely and closed the cross-point prepared by select magnet 600, it closes a locking circuit for itself from ground on conductor 403 over its contact 2, conductor 405, contact 5 of relay 404, conductor 635 to battery through its winding. This locking ground shunts the right winding of relay 634 so that relay 634 now releases in turn releasing relay 630.

When relay 630 operated it closed a circuit from battery through resistance 641, winding and contact 1 of relay 637, contact 2 of relay 630, conductor 406 to ground at contact 7 of relay 400. Relay 637 operates and locks over its contact 2 to ground on conductor 406, closing a circuit from ground on conductor 406, contact 2 of relay 637, winding of relay 638, resistance 642 to battery, but relay 638 does not operate being shunted over its contact 3 by the operating ground for relay 637. When relay 630 releases, this shunt is opened and relay 638 also operates to prepare for registering the first digit of the wanted line designation.

When relay 638 operates, it closes a circuit from battery through resistance 643, winding and contact 3 of relay 639, contact 4 of relay 638 to ground on conductor 406. Relay 639 operates and locks over its contact 2 to ground on conductor 402. At the same time relay 639 closes a circuit from ground on conductor 402 over contact 2 of relay 639, winding of relay 640, resistance 644 to battery, but relay 640 does not operate, being shunted over its contact 2 by the operating ground for relay 639.

With relay 639 operated, a circuit is closed from ground connected to conductor 304 by the sender link circuit 103, contact 2 of relay 302, contact 21 of relay 300, conductor 305, contact 1 of relay 639, conductor 647, winding of off-normal relay 427 to battery, operating relay 427. Relay 427 connects a supplementary ground to conductor 632, supplying a locking circuit for relay 400.

As soon as the line class relays (not shown) have operated, off-normal relay 410 is operated, completing the dialing circuit which may be traced from ground through the right winding of dial tone coil 412, contact 3 of relay 410, contact 3 of relay 413, conductor 414, through the sender link 103, conductor 104, through the line switches 102 and 101 and substation 100, back through line switches 101 and 102, conductor 105, through the sender link to conductor 415, contact 2 of relay 413, contact 2 of relay 410, upper winding of relay 416 to battery. Relay 416 is polarized by a circuit from battery through its lower winding to ground at contact 1 of relay 400 to hold its contact 2 closed. When the circuit through its upper winding is closed as above traced, it closes its contact 1, completing a circuit from ground at contact 1 of relay 400, contact 1 of relay 404, contact 1 of relay 416, winding of relay 417, winding of relay 418 to battery. Relay 417 follows the operation and release of relay 416 during dialing but relay 418, which is slow to release, remains operated until the sender is released. Relay 418 operates relay 419, and prepares the circuit for operating the pulse counting relays indicated by the rectangle 421.

With relay 419 operated, a circuit is closed from ground supplied to conductor 306 by the sender link circuit 103, contact 1 of relay 302, contact 23 of relay 300, conductor 307, contact of relay 401, contact 1 of relay 419, winding of off-normal relay 428 to battery. Relay 428 operates and locks in a circuit over its contact 1, contact 1 of relay 413, contacts 1 and 2 of relay 427 to ground at contact 2 of relay 428. Relay 427 also locks over its contact 1 to ground at contact 2 of relay 428. With relay 428 operated, the control circuit of the sender link 103 is released as described in the Brooks-Carpenter patent and relays 302 and 303 are released.

The registration of the wanted line number takes place as described in the above-identified Brooks-Carpenter patent, relays 637, 638, 639 and 640 functioning to control the successive operation of the hold magnets of the register switch. When the third digit is registered, hold magnet 623 is operated, in turn operating relay 636, and when the fifth or hundreds digit is registered, relay 645 is operated, to supplement the control of relays 637 to 640.

The operation of relay 636 is an indication that the office code has been registered, and relay 636 closes a circuit from ground on conductor 407, contact 1 of relay 636, conductor 646, contact 17 of relay 300, conductor 301 to battery through the winding of relay 422. Relay 422 operates and locks over its contact 1 to ground on conductor 407 and connects battery to conductor 423 and ground to conductor 424. Battery on conductor 423 is also extended over contact 1 of relay 426 to conductor 425. Conductors 423, 424 and 425 extend to the marker and recorder connector 500 to cause that connector to select an idle marker 501 and connect the marker with the sender. With the connector 500 operated, the frame registration and office code registration are transferred to the marker 501 which functions in well-known manner to select a trunk outgoing to the office indicated by the code and set up a connection between the district junctor and that office.

During these operations the marker operates an individual preference relay 502 in the district link control circuit, which operates multicontact relay 503. At the same time it sets up a circuit over conductor 509 through the sender and sender link 103 to conductor 106, operating relay 107. Relay 107 extends its operating circuit over its contact 5 to conductor 108 to operate relay 504 individual to the district junctor in the district link control circuit. Relay 504 locks over its contact 3 and contact 3 of relay 503 under the control of the marker, holding relay 107 operated. With relays 503, 504 and 107 operated, an indirect connection exists between the marker and the sender and the marker instructs the sender to release the direct connection.

Having determined from the office code that the entire called number should be recorded, the marker 501 connects ground through connector 500 to conductor 505, operating record relay 429, which locks to off-normal ground in the sender. In order to release the direct connection, the marker 501 grounds conductor 506, operating marker release relay 426. Relay 426 operated, disconnects battery from conductor 425 thereby releasing the connector 500.

When the marker has completed the connection between the district junctor and the distant office, it releases relay 107. The sender then transmits the numerical designation to the distant office, obtaining access thereto through the sender link and conductors 111 and 112.

When the sender has completed the transfer of the designation, ground is connected to conductor 430, completing a circuit over contact 1 of relay 410, over the back contacts or the front contacts of the two tip party TP1 and TP2 relays 431 and 432, which are both operated or both released according to the nature of the calling substation, contact 2 of relay 419, contact 2 of relay 429, contact 3 or relay 433 to battery through the winding of relay 434. Relay 434 operates in this circuit and at its contact 4 closes a substitute holding circuit for the frame hold magnet 620. Relay 434 connects battery over its contact 1 to conductor 435, a branch of which extends over contact 2 of relay 433 to conductor 436. At its contact 2, relay 434 connects ground to conductor 437. These conductors lead to the marker and recorder connector 500 which now functions to connect the called number recorder 507 with the sender. The called line designation and frame designation are now transferred to the called number recorder.

With relay 434 operated, the circuit above traced from ground to contact 2 of relay 429 is extended over contact 3 of relay 434 to battery through the winding of relay 404. Relay 404 operates and locks over its contact 2 to ground at contact 8 of relay 400. Relay 404 disconnects relay 416 from the calling line, opens the first holding circuit for magnet 620, initiates a timing operation and connects ground over its contact 4, conductor 436, through the sender link 103, conductor 113, contact 1 of relay 107, to battery through the winding of relay 114. Relay 114 operates and locks over its contact 4, contact 1 of relay 115 or contact 14 of relay 116, contact 6 of relay 114 to ground at contact 1 of relay 110. With relay 114 operated, ground at contact 1 of relay 110 is conected over contact 6 of relay 114, contact 1 of relay 115 or contact 14 of relay 116 to resistance 117 and the sleeve conductor 118 to hold the line switches.

Relay 114 also extends the incoming tip conductor 104 over its contact 1 and contact 1 of relay 116 to ground through the upper winding of relay 121 and extends the incoming ring conductor 105 over its contact 8 and contact 13 of relay 116 to battery through the lower winding of relay 121. Relay 121 operates over the calling line and closes a holding circuit for relay 110.

In addition, relay 114 closes a circuit from outgoing tip conductor 111, contact 3 of relay 116, contact 2 of relay 114, contact 4 of relay 110, winding of the polarized supervisory relay 122, contact 6 of relay 116, contact 7 of relay 114, contact 11 of relay 116 to outgoing ring conductor 112. A talking circuit is closed from incoming tip conductor 104, contact 1 of relay 114, contact 1 of relay 116, through condenser 123, contact 7 of relay 114, contact 11 of relay 116 to the outgoing ring conductor 112 and from incoming ring conductor 105, contact 8 of relay 114, contact 13 of relay 116, condenser 124, contact 2 of relay 114, contact 3 of relay 116 to outgoing tip conductor 111.

When the called line number has been registered, checked and locked in by the called number recorder 507, it operates the recorder preference relay 510 in th district link control circuit, in turn operating relay 511. In addition, it grounds conductor 509, reoperating relay 107 in the district junctor. Relay 107 operates relay 504 to connect the recorder through to the district junctor. When this connection has been completed recorder 507 connects ground through the connector 500 to conductor 508, operating relay 433, which disconnects battery from conductor 436 to release connector 500.

At the end of the time interval initiated by relay 404, ground is connected to conductor 437, operating relay 413 which opens the locking circuit for relay 428. Relay 428 releases, in turn releasing relays 427 and 400, and thereby restoring the sender to normal.

The recorder grounds conductor 512 which extends over contacts of relays 511 and 504 to conductor 513, contact 7 of relay 107 to the winding of relay 125 which receives battery from the tape recorder 514. Relay 125 operates and locks to battery over its own contact 3. Relay 125 operates relay 126 which initiates the operation of the tape recorder and supplies the number of the district junctor. The called number is transmitted from the called number recorder 507 to the tape recorder 514 over contacts of relay 511. When the called number has been recorded by the tape recorder 514 the called number recorder 507, the district link control circuit and relay 107 are released as described in the Brooks-Carpenter patent.

*Operator assistance call*

Figure 2:
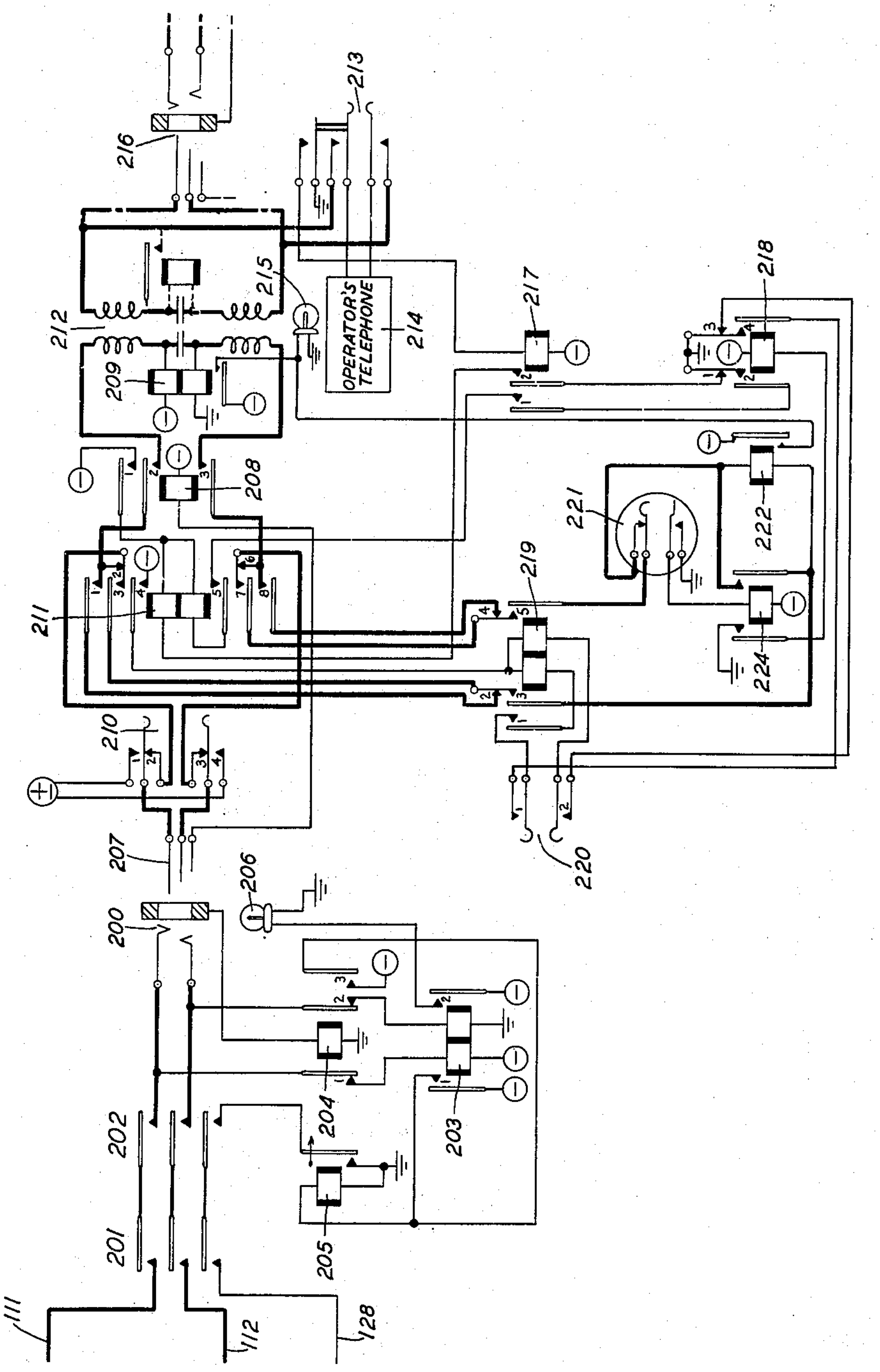
Fig. 2 shows a cord circuit at an operator's position together with a trunk circuit terminating at that position and the switches connecting the trunk circuit with the district junctor of Fig. 1.
Figure 3:
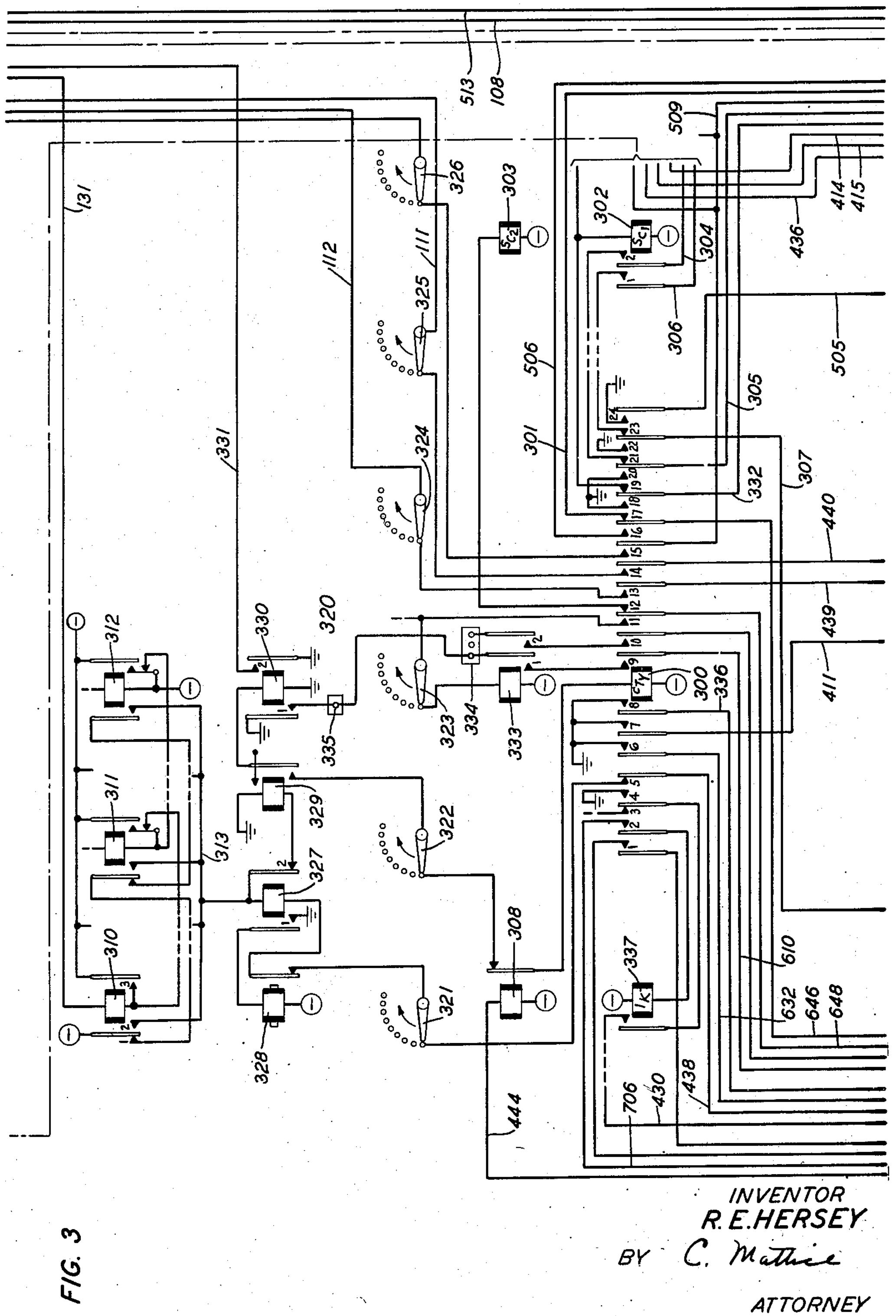
Fig. 3 shows a sender connector and a part of a sender.
Figure 4:
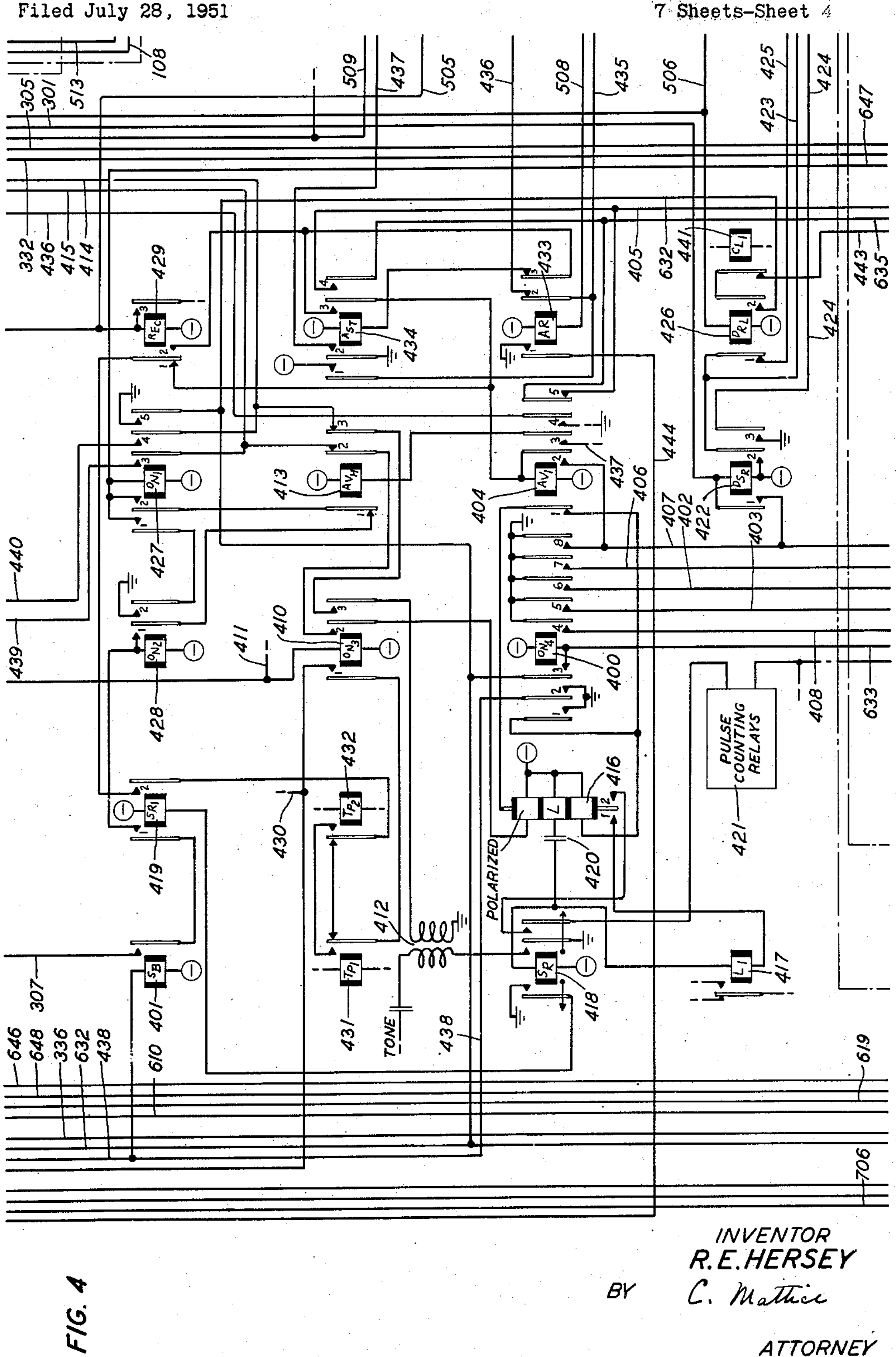
Figs. 4, 6 and 7 show other portions of the sender.
Figure 5:
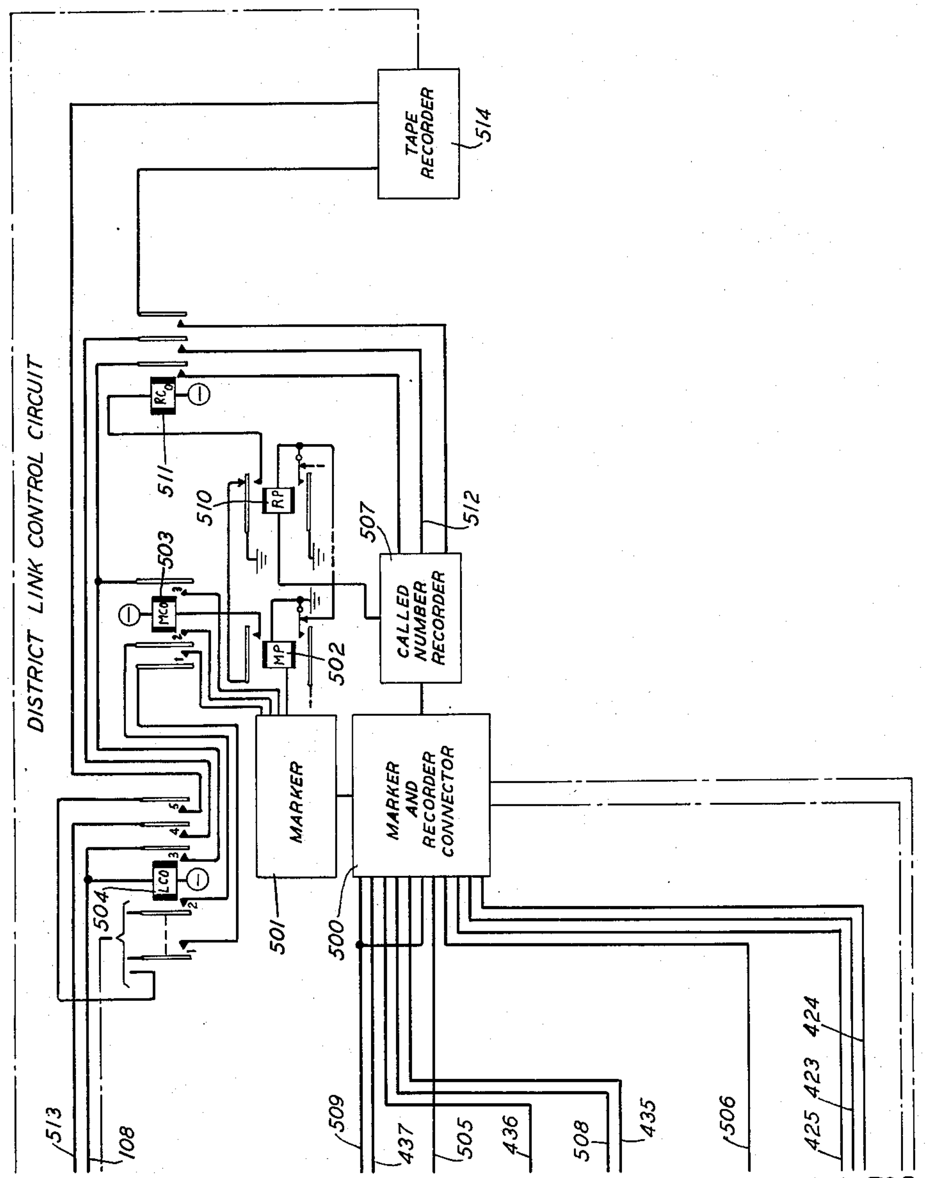
Fig. 5 shows a marker, a called number recorder, and a connector for connecting the sender therewith as well as a tape recorder and a link circuit for connecting the marker with the district junctor.

If the calling subscriber requires the assistance of an operator in completing the desired connection, he will dial either zero or the proper code, for example 211. In response to the registration of either of these operator designations, the sender calls in a marker and transmits the designation thereto. The marker selects a trunk such as the trunk appearing in jack 200 at the operator's position of Fig. 2 and operates the district and office switches indicated by switches 201 and 202 to connect the district junctor therewith. While the marker is connected with the junctor, it grounds conductor 127, completing a circuit over contact 3 of relay 107 to battery through the winding of relay 116. Relay 116 locks under the control of the sender until relay 114 operates, after which it is locked to ground at contact 5 of relay 114.

In the sender, since no charge is to be made for a call to an operator, relay 429 is not operated by the marker and when conductor 430 is grounded, the circuit previously traced for operating relay 434, now extends over contact 1 of relay 429 to the winding of relay 404 to bring about the release of the sender.

In the district junctor, with relays 114 and 116 both operated, the subscriber's line is connected directly to the trunk circuit apearing in jack 200 and a circuit is closed from battery through the left winding of relay 203, contact 1 of relay 204, tip contacts of switches 202 and 201, conductor 111, contact 2 of relay 116, contact 1 of relay 114, conductor 104, tip contacts of line switches 102 and 101 through substation 100, ring contacts of line switches 101 and 102, conductor 105, contact 8 of relay 114, contact 12 of relay 116, conductor 112, ring contacts of switches 201 and 202, contact 2 of relay 204, right winding of relay 203 to ground.

Relay 203 operates in this circuit, connecting battery over its contact 1 through the winding of relay 205 to ground, operating relay 205 which connects ground over the sleeve contacts of switches 202 and 201, conductor 128, contact 9 of relay 107, and contact 9 of relay 116, in parallel with the ground supplied by relay 110 for locking relay 114, thereby placing the release of the junctor under the control of the operator trunk.

At its contact 2, relay 203 connects battery through lamp 206 to ground, lighting the lamp to inform the operator that a call is waiting on this trunk. The operator inserts plug 207 of one of her cord circuits in jack 200 completing a circuit from battery through the winding of relay 208, sleeves of plug 207 and jack 200 to ground through the winding of relay 204. Relays 204 and 208 operate, relay 204 disconnecting relay 203 from the subscriber's line at its contacts 1 and 2, and connecting battery over its contact 3 to the winding of relay 205. Relay 205 is slow to release so that it maintains its contact closed even if its circuit is opened by the release of relay 203 before it is reclosed by relay 204. The release of relay 203 extinguishes lamp 206.

With relay 208 operated the subscriber's line is extended to the windings of relay 209, the circuit extending as above traced from the substation to conductors 111 and 112, and extending from conductor 111 over the tip contacts of switches 201 and 202, jack 200, and plug 207, contact 2 of ringing key 210, contact 2 of relay 211, contact 2 of relay 208, upper left winding of repeating coil 212 to battery through the upper winding of relay 209 and from conductor 112 over the ring contacts of switches 201 and 202, jack 200 and plug 207, contact 3 of ringing key 210, contact 6 of relay 211, contact 3 of relay 208, lower left winding of repeating coil 212, lower winding of relay 209 to ground. Relay 209 operates in this circuit, lighting cord lamp 215.

The operator now operates her talk key 213, connecting her telephone across the right windings of repeating coil 212 and receives the request of the calling subscriber, and may complete the call by means of the calling plug 216 of her cord. If the requested connection requires a charge she will make a note of the called number.

When lamp 215 is extinguished to indicate that the calling subscriber has disconnected the operator again throws her talk key 213, operating relay 217. With relay 217 operated, a circuit is closed from battery over contact 1 of relay 208, upper winding of relay 211, contact 2 of relay 217 to ground at contact 1 of relay 218. Relay 211 operates and connects the tip of plug 207, over contact 2 of key 210, contact 3 of relay 211, contact 2 of relay 219, contact 1 of relay 211, contact 2 of relay 208, the upper left winding of repeating coil 212, through the upper winding of relay 209 to battery and connects the ring of plug 207, over contact 3 of key 210, contact 7 of relay 211, contact 4 of relay 219, contact 8 of relay 211, contact 3 of relay 208, lower left winding of repeating coil 212 to ground through the lower winding of relay 209.

The operator now operates ringing key 210 to transmit ringing current over conductors 111 and 112 to the district junctor, holding the key operated for a sufficient interval to permit the subsequently described operations to take place. With relay 116 operated, conductor 111 is connected over contact 4 of relay 116, through the winding of alternating-current relay 129, contact 10 of relay 116 to conductor 112. Relay 129 responds to the ringing current applied to conductors 111 and 112, and operates relay 130. Relay 130 connects ground over conductor 131, to the winding of preference relay 310. The circuit of relay 310 extends to battery over the normal contacts of other preference relays such as relays 311 and 312 individual to other district junctors on the same frame. If the other preference relays are normal, relay 310 operates, locking over its contact 3 to battery and connects battery over its contact 2 to start and test conductor 313 of sender connector 320 individual to the junctor frame. Conductor 313 is extended through the winding of relay 327, back contact of stepping magnet 328, brush 321 of switch 320 and contact 5 of relay 300 to conductor 438 of the sender on the terminals of which switch 320 is standing. If that sender is busy, ground is connected to conductor 438 and relay 327 operates, in turn operating magnet 328. Magnet 328 opens the circuit of relay 327 which releases, in turn releasing magnet 328 and stepping switch 320 to the next sender.

Assuming that the sender shown is idle, no ground will be found on conductor 438, and relay 327 does not operate. Battery on conductor 313 is also extended over contact 2 of relay 327 to ground through the winding of relay 329, but relay 329 is sufficiently slow to operate so that it does not operate while switch 320 is hunting for an idle sender. When relay 327 remains released, relay 329 operates, closing a circuit from ground through winding of relay 330, contact of relay 329, brush 322, back contact of relay 308 to battery through the winding of relay 300. Relays 300 and 330 operate, relay 330 connecting ground to conductor 331 to provide a locking circuit for relay 130.

With relay 300 operated, a plurality of control circuits are closed for the sender. At its contact 18, relay 300 connects ground to conductor 332, completing a circuit over the back contact of the frame register hold magnet 620, conductor 648, contact 11 of relay 300, brush 323 to battery through the winding of relay 333. Each sender has a cross-connecting rack 334 having ten terminals corresponding to the ten select magnets of the sender register, while each sender finder has a terminal 335 which is cross-connected to that terminal on rack 334 corresponding to the units digit of associated frame number.

With relay 333 operated, as above described, the winding of the select magnets are connected to the terminals of rack 334 and a circuit is closed from ground over contact 1 of relay 330, terminal 335, rack 334, contact 1 of relay 333, contact 9 of relay 300, conductor 610, winding of select magnet 600 to battery through resistance 629. Select magnet 600 operates, operating relay 631 as previously described. Relay 300 at its contact 6 connects ground to conductor 632 so that relay 400 operates following the operation of relay 631 in turn operating relay 401. With relays 400 and 631 operated, relay 634 operates as previously described. Relay 300, at its contact 8 connects ground to conductor 336 for operating relay 630 in response to the operation of relay 634. The circuit previously traced for the hold magnet 620 is closed by relay 630 and the frame registration locked in. When magnet 620 operates, relay 333 releases, disconnecting the select magnets from rack 334. Relays 637, 638 and 639 operate as a result of the frame registration as previously described, after which off-normal relay 427 is operated, the circuit extending as before to conductor 305 which is grounded at contact 20 of relay 300. Off-normal relay 410 operates over conductor 411 to ground at contact 7 of relay 300. With relays 300 and 410 operated, a circuit is closed for relay 416 which extends from battery through its upper winding, contact 2 of relay 410, contact 2 of relay 413, contact 3 of relay 427, conductor 439, contact 13 of relay 300, brush 324, conductor 112, ring contacts of switches 201 and 202, ring contacts of jack 200 and plug 207, contact 3 of ringing key 210, which will have been restored, and thence as previously traced to ground through the lower winding of relay 209. A circuit is also closed from ground through the right winding of tone coil 412, contact 3 of relay 410, contact 3 of relay 413, contact 4 of relay 427, conductor 440, contact 14 of relay 300, brush 325, conductor 111, tip contacts of switches 201 and 202, jack 200 and plug 207, contact 2 of ringing key 210 and thence as previously traced to battery through the upper winding of relay 209. Relays 416 and 209 operate in these circuits, relay 209 lighting lamp 215 as an indication that the sender is ready for dialing. Relay 416 operates relays 417 and 418 and relay 418 operates relay 419. With relays 419 and 401 operated, off-normal relay 428 operates in a circuit which extends as previously traced to conductor 307 and thence to ground at contact 22 of relay 300.

The operator seeing lamp 215 light, operates dial key 220, closing a circuit from battery over contact 4 of relay 211, right winding of relay 219, contact 2 of key 220, to ground at contact 3 of relay 218. Relay 219 operates and sets up a new circuit for relay 416 which extends as above traced to contact 7 of relay 211 and thence over contact 5 of relay 219, pulsing contact of dial 221, winding of relay 222, contact 3 of relay 219, contact 3 of relay 211 and thence to ground through the right winding of tone coil 412. Relay 222 operates and keeps lamp 215 lighted.

The operator now operates her dial 221 to transmit the wanted designation to the sender, the off-normal contact operating relay 224 to shunt relay 222 and operate relay 218, the latter relay providing holding circuits for relays 211 and 219.

The line designation is recorded in the usual manner. With relay 300 operated, the circuit for operating relay 422 to call in a marker is opened at contact 17 of relay 300 and is extended over contact 16 of relay 300 to conductor 506, operating relay 426 to simulate the completion of the marker functions.

When the units digit has been dialed, hold magnet 627 operates closing a circuit from ground over its contact, conductor 649 to battery through the upper winding of relay 700. Relay 700 operates and closes a circuit from ground over contact 5 of relay 427, conductor 632, contact 2 of relay 426, back contact of class relay 441, which has not been operated since no marker was used, conductor 443, contact 2 of relay 700, contact 2 of relay 701 to interrupter 702. When interrupter 702 closes its contact it extends ground over contact 2 of relay 703 to battery through the winding of relay 704. Relay 704 operates and locks through the winding of relay 703 over contact 5 of relay 701 to ground on conductor 632 but relay 703 does not operate until the interrupter opens its contact. When relay 703 operates, it extends the interrupted ground to two other pairs of counting relays (not shown) which operate in turn in response to the next two interrupter closures finally extending the interrupted ground over contact 2 of relay 705 to battery through the winding of relay 707. Relay 707 operates in response to the fourth closure and locks through the winding of relay 705 to conductor 632, the latter relay operating when interrupter 702 opens its contact. Relay 705 at its contact 1 connects ground on conductor 632 to battery through the winding of relay 701. Relay 701 opens the interrupter circuit, releases relays 703 and 704, holds relay 700 operated and closes a circuit from ground on conductor 632, contact 4 of relay 701, conductor 706, contact 2 of relay 300 to battery through the winding of relay 337.

Relay 300 at its contact 24 connected ground to conductor 505, operating relay 429 to indicate that a record was to be made. Therefore when relay 337 operates, it closes a circuit from ground at contact 4 of relay 300, contact of relay 337, conductor 430 and thence as previously traced to the winding of relay 434 to call in the called number recorder and transfer thereto the number registered by the operator.

When the called number has been recorded, relay 433 is operated, closing a circuit from ground over its contact 1 and conductor 444 to battery through the winding of relay 308. Relay 308 operates and opens the circuit of relay 300, permitting the sender to restore to normal. With relay 300 released, the circuit of relay 222 is opened and that relay releases extinguishing lamp 215, after which the operator withdraws plug 207 from jack 200, permitting the district junctor, the preference relay 310 and switches 201 and 202 to restore to normal.

The operator may restore her dial key immediately after dialing, in which case relay 209 is operated as previously described maintaining the circuit for lamp 215 until the sender is released.

What is claimed is:

1. In a telephone system, a calling line, a trunk circuit, control equipment, an operator's position, terminating equipment, a recorder, means responsive to the initiation of a call on said calling line for connecting said line with said trunk circuit and with said control equipment, means under the control of said control equipment to connect said line with said operator's position over said trunk circuit, means responsive to the connection of said line with said operator's position to disconnect said control equipment from said line and said trunk circuit, means under the control of said operator's position to connect said trunk circuit with said terminating equipment, means under the control of said operator's position to reconnect said trunk with said control equipment and to record the identity of said terminating equipment in said control equipment, and means to cause said control equipment to transmit said recorded identity to said recorder.

2. In a telephone system, a calling line, a trunk circuit, an operator's position, a register sender, a primary sender connector, a recorder, means responsive to the initiation of a call on said calling line for connecting said line with said trunk circuit and for operating said primary sender connector to connect said register sender with said calling line and said trunk circuit, means under the control of said register sender to connect said line with said operator's position over said trunk circuit, means responsive to the connection of said line with said operator's position to disconnect said register sender from said line and said trunk circuit, means under the control of said operator's position to connect said trunk circuit with said terminating equipment, an auxiliary sender connector, means under the control of said operator's position to operate said auxiliary sender connector to reconnect said trunk with said register sender and to record the identity of said terminating equipment in said register sender, and means to cause said register sender to transmit said recorded identity to said recorder.

3. In a telephone system, a calling line, a plurality of trunk circuits, a plurality of register senders, a primary sender connector, an operator's position, a called line, a recorder, means responsive to the initiation of a call on said calling line for connecting said line with one of said trunk circuits and for operating said primary sender connector to connect one of said register senders with said calling line and said trunk circuit, means under the control of said one register sender to connect said line with said operator's position over said one trunk circuit, means responsive to the connection of said line with said operator's position to disconnect said register sender from said line and said trunk circuit, means under the control of said operator's position to extend said trunk circuit toward said called line, an auxiliary sender connector, means under the control of said operator's position to operate said auxiliary sender connector to reconnect said trunk circuit with one of said register senders and to record the identity of said called line in said register sender, and means to cause said register sender to transmit said recorded identity to said recorder.

4. In a telephone system, a calling line, a plurality of trunk circuits, a plurality of register senders, a primary sender connector, an operator's position, a called line, a recorder, means responsive to the initiation of a call on said calling line for connecting said line with one of said trunk circuits and for operating said primary sender connector to connect one of said register senders with said calling line and said trunk circuit, means under the control of said one register sender to connect said line with said operator's position over said one trunk circuit, means responsive to the connection of said line with said operator's position to disconnect said register sender from said line and said trunk circuit, means under the control of said operator's position to extend said trunk circuit toward said called line, an auxiliary sender connector, means under the control of said operator's position to operate said auxiliary sender connector to reconnect said trunk with one of said register senders and to record the identity of said called line in said register sender, and means operated by said auxiliary sender connector to cause said register sender to transmit said recorded identity to said recorder.

5. In a telephone system, a calling line, a plurality of trunk circuits, a plurality of register senders, a primary sender connector, an operator's position, a called line, a recorder, means responsive to the initiation of a call on said calling line for connecting said line with one of said trunk circuits and for operating said primary sender connector to connect one of said register senders with said calling line and said trunk circuit, means under the control of said one register sender to connect said line with said operator's position over said one trunk circuit, means responsive to the connection of said line with said operator's position to disconnect said register sender from said line and said trunk circuit, means under the control of said operator's position to extend said trunk circuit toward said called line, an auxiliary sender connector common to said plurality of trunks, means under the control of said operator's position to connect said auxiliary sender connector with said one trunk, to operate said auxiliary sender connector to reconnect said trunk with one of said register senders and to record the identity of said called line in said register sender, and means operated by said auxiliary sender connector to cause said register sender to transmit said recorded identity to said recorder.

RALPH E. HERSEY.

References Cited in the file of this patent

UNITED STATES PATENTS

| Number | Name | Date |
|---|---|---|
| 2,253,998 | Beerman et al. | Aug. 26, 1941 |
| 2,291,496 | Newstedt | July 28, 1942 |
| 2,404,654 | Potts | July 23, 1946 |